US009942626B2

(12) United States Patent
Ridley

(10) Patent No.: US 9,942,626 B2
(45) Date of Patent: Apr. 10, 2018

(54) LOW POWER WIRELESS RF COMMUNICATION PLATFORM AND AD-HOC SECURITY NETWORK UTILIZING SAME

(71) Applicant: XIPITER, LLC, Portland, OR (US)

(72) Inventor: Stephen A. Ridley, Portland, OR (US)

(73) Assignee: XIPITER, LLC, Portland, OR (US)

( * ) Notice: Subject to any disclaimer, the term of this patent is extended or adjusted under 35 U.S.C. 154(b) by 131 days.

(21) Appl. No.: 14/483,014

(22) Filed: Sep. 10, 2014

(65) Prior Publication Data

US 2015/0091739 A1 Apr. 2, 2015

Related U.S. Application Data

(60) Provisional application No. 61/876,162, filed on Sep. 10, 2013.

(51) Int. Cl.
*G08C 15/06* (2006.01)
*H04Q 9/00* (2006.01)

(52) U.S. Cl.
CPC ........... *H04Q 9/00* (2013.01); *H04Q 2209/43* (2013.01); *H04Q 2209/883* (2013.01)

(58) Field of Classification Search
CPC .................................................. A61B 5/4866
USPC .......................... 340/870.01, 870.02, 870.03
See application file for complete search history.

(56) References Cited

U.S. PATENT DOCUMENTS

| 5,748,103 | A * | 5/1998 | Flach | A61B 5/0006 340/870.07 |
|---|---|---|---|---|
| 6,093,146 | A * | 7/2000 | Filangeri | G06F 19/3406 128/904 |
| 6,893,396 | B2 * | 5/2005 | Schulze | A61B 5/0022 128/903 |
| 2006/0055552 | A1 * | 3/2006 | Chung | B60R 25/00 340/686.1 |
| 2006/0253735 | A1 * | 11/2006 | Kwak | G06F 1/3203 714/12 |
| 2010/0198032 | A1 * | 8/2010 | Simpson | A61B 5/0002 600/365 |
| 2013/0036210 | A1 * | 2/2013 | Birtwhistle | G06F 19/3412 709/221 |
| 2014/0059200 | A1 * | 2/2014 | Nguyen | H04L 43/026 709/224 |

* cited by examiner

*Primary Examiner* — Amine Benlagsir
(74) *Attorney, Agent, or Firm* — Ascenda Law Group, PC

(57) ABSTRACT

Wireless radio frequency communications platform may include a plurality of sensor units communicatively coupled over a wireless radio frequency communication network to a collector unit. The sensor units may be configured to collect data concerning monitored parameters and relay the collected data to a collector unit via a wireless radio frequency communication. The collector unit may be configured to receive and store the collected data received from the plurality of sensors and transmit the collected data to a computing device upon receiving an indication that the collector unit is communicatively coupled to the computing device. The computing device may execute a computer software application that facilitates communication between the computing device and collector unit.

11 Claims, 4 Drawing Sheets

44

44

LOW POWER WIRELESS RF COMMUNICATION PLATFORM AND AD-HOC SECURITY NETWORK UTILIZING SAME

RELATED APPLICATION

This application is a NON-PROVISIONAL of U.S. Application No. 61/876,162 filed Sep. 10, 2013, which is incorporated herein by reference in its entirety.

FIELD OF THE INVENTION

The present invention relates to a low power, wireless radio frequency (RF) communications platform configurable as a plurality of sensor units and operable to collect and relay data concerning monitored parameters to a designated collector unit.

BACKGROUND

Monitoring systems are typically deployed using multiple monitor devices that observe an environment for the occurrence of various conditions and report the observed conditions to a centralized device, such as a computer or monitoring console that is operated by a security company or individual. Typically, the monitor devices are permanently installed in particular locations, are coupled to a power supply, and are hardwired with a communication link to the centralized device. As a result, individual monitor devices are not self-contained and are difficult to move or reposition.

BRIEF DESCRIPTION OF THE DRAWINGS

The present invention is illustrated by way of example, and not limitation, in the figures of the accompanying drawings, in which.

SUMMARY

Figure 1:
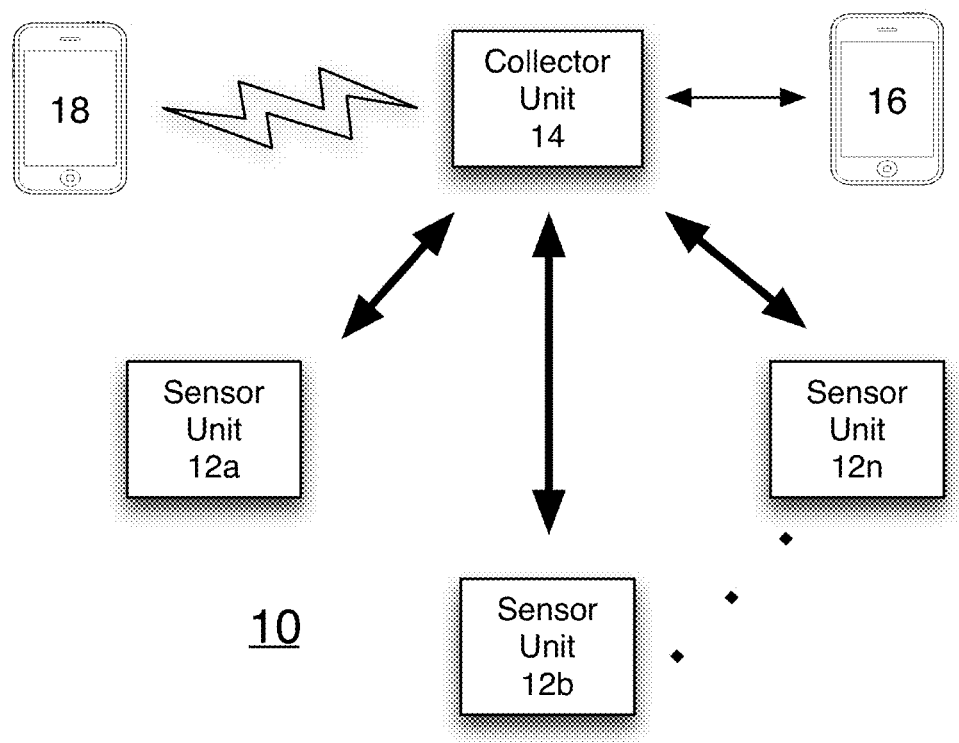
FIG. 1 is a block drawing illustrating an example of a network environment within which embodiments of the invention may be instantiated.

The present invention may be used to establish a low power, wireless radio frequency (RF) communications platform configurable as a plurality of sensor units and operable to collect and relay data concerning monitored parameters to a designated collector unit via a wireless radio frequency communication. In some embodiments, the relayed information may be encrypted. The plurality of sensor units may be configured so as to minimize the amount power required for their operation. For example, the plurality of sensor units may be configured to operate in a low-power standby mode until an observable event occurs or a transmission is made.

In some embodiments, the sensor units may be self-contained such that external power and/or communication support is not necessary for the operation of any particular sensor unit. The sensor units may also be portable so they may be placed in a location, removed from the location, or repositioned without decoupling from a power supply and/or physical communication network.

Exemplary monitored parameters include temperature, humidity, light, motion, movement, pressure, magnetic fields, and electric fields. At times, a time of day when an observable event occurs, a location of the sensor unit, and a power level of the sensor unit may also be relayed to the collector unit when relaying the collected data to the collector unit.

The sensor units may include a memory configured to store collected data. Often times, the data may not be stored unless communication with the collector unit is disrupted. In this instance, the data may be stored until communication with the collector unit is restored. Upon restoration, the sensor unit may relay the stored information to the collector unit and, in some instances, the stored data may be deleted from storage once relayed to the collector unit.

The collector unit may be communicatively coupled to the plurality of sensor units via a wireless radio frequency communication network. In some embodiments, the collector unit may be self-contained and portable. At times, the wireless radio frequency communication network may be compliant with one or more communications standards, such as the IEEE 802.15 standard.

The collector unit may receive and store the collected data received from the plurality of sensors and transmit the collected data to a computing device upon receiving an indication that the collector unit is communicatively coupled to the computing device. Exemplary indications of a communicative coupling may be received when the collector unit is physically or wirelessly coupled to the computing device. The computing device may execute a computer software application that facilitates communication between the computing device and the collector unit. In some cases, the computer software application may also facilitate management and configuration of the collector unit and/or the sensor units.

In some embodiments, the collector unit may be configured to send an alert to the computing device upon receiving an indication that an observable event has occurred or is occurring from one of the plurality of sensors. The alert may take any appropriate form (e.g., an email, a SMS text message, a tone, etc.).

In one embodiment the wireless radio frequency communications platform may include a router positioned between and communicatively coupled to the collector unit and the plurality of sensors. The router may be configured to receive the relayed collected data from the plurality of sensor units prior to receipt by the collector unit and transmit the relayed collected data to the collector unit.

DETAILED DESCRIPTION

Described herein is a wireless RF communication platform. The platform is configurable to operate as any of a plurality of low power, mobile sensors to collect and relay data concerning monitored parameters to a designated collector unit. The collector unit may itself be one of the wireless communication platforms and may, in some instances, be communicatively coupled to a smart phone or tablet computer running an appropriate app, or a personal computer running appropriate application software. The monitored parameters depend upon the sensor package deployed with the wireless communications platform and may include temperature, humidity, light, motion/movement, magnetic/electric fields, etc. Thus, the present invention facilitates the deployment of very lowpower "wireless personal area networks" using appropriately configured ones of the wireless communication devices.

FIG. 1 illustrates an example of such a network 10. In this example, three sensor units 12a-12n have been deployed and are communicatively coupled over a wireless communication network to a collector unit 14. Each of the sensor units 12a-12n are instances of the wireless RF communication platform described in further detail below and each may be configured with one or more sensors. For example, sensor unit 12a may be configured with a light sensor; sensor unit 12b may be configured with a Hall effect sensor (to measure magnetic fields), and sensor unit 12n may be configured with a motion detector (e.g., an accelerometer). Although three sensor units are illustrated in this example, networks that utilize sensor units configured in accordance with the present invention may be made up of any number of sensor units. The collector unit 14 may also be an instance of the present wireless RF communication platform. Accordingly, collector unit 14 may also include a sensor.

In operation, sensor units 12a-12n collect data from their onboard sensors and relay same (in near real time) to the collector unit 14 over a wireless communication network. In one embodiment, the wireless communication network is a ZigBee communication network (e.g., one compliant with the IEEE 802.15 standard), however, other wireless communication protocols can be used. ZigBee devices typically are able to communicate over ranges of approximately 10-100 meters. In the event a sensor unit 12a-12n is outside an effective communication range with collector unit 14, it stores sensor data in an onboard storage device (e.g., flash memory, micro SD card, or other onboard storage device) until such time as it can reestablish communications with the collector unit 14 and relay said data. Alternatively, one or more of the sensor units may be configured to store sensor data and to transmit same to collector unit 14 only periodically, according to a defined or ad-hoc transmission schedule, or on-demand according to a request for data from the collector unit 14. Although not illustrated in this example, storage units 12 may relay sensor data to collector unit 14 through other communication devices (such as a ZigBee router, etc.); thus network 10 may, in some instantiations, be a mesh network made up of one or more ZigBee end devices (e.g., sensor units 12a-12n), one or more ZigBee routers (and here a sensor unit may be a ZigBee router) and a ZigBee coordinator (e.g., collector unit 14).

As noted above, the present invention is not limited to use of ZigBee devices and communication protocols; other wireless communication protocols can be used. Likewise, although embodiments of the invention operate in unlicensed frequency bands such as the ISM and RSD frequency bands, other implementations operate in frequency bands such as 300-348 MHz, 389-464 MHz, and 779-928 MHz. In still further instances, the present invention may make use of proprietary frequency bands reserved to a particular service provider.

Periodically, on-demand, or according to a predetermined schedule, the collector unit may be communicatively coupled to a personal computer system, smart phone or tablet computer 16 to download collected sensor data for analysis, long term storage, etc. In addition, the collector unit may be configured to send an alert (e.g., a text message, email message, or other alert) to one or more designated alert receivers 18 (e.g., a mobile phone, email address, etc.) in the event sensor data from the collector unit or one of the sensor units indicates a monitored event has occurred or is occurring. An alert receiver 18 may be the same platform 16 that is configured to receive the collected sensor data from collector unit 14. Monitored events may be any desired events, such as a monitored temperature rising above and/or falling below a predetermined temperature or temperature range, a humidity level rising above and/or falling below a predetermined humidity level or humidity range, motion of an object associated with a sensor unit 12 being detected, a "trip wire" being triggered (e.g., as indicated by a light sensor or Hall effect sensor), etc.

Figure 2:
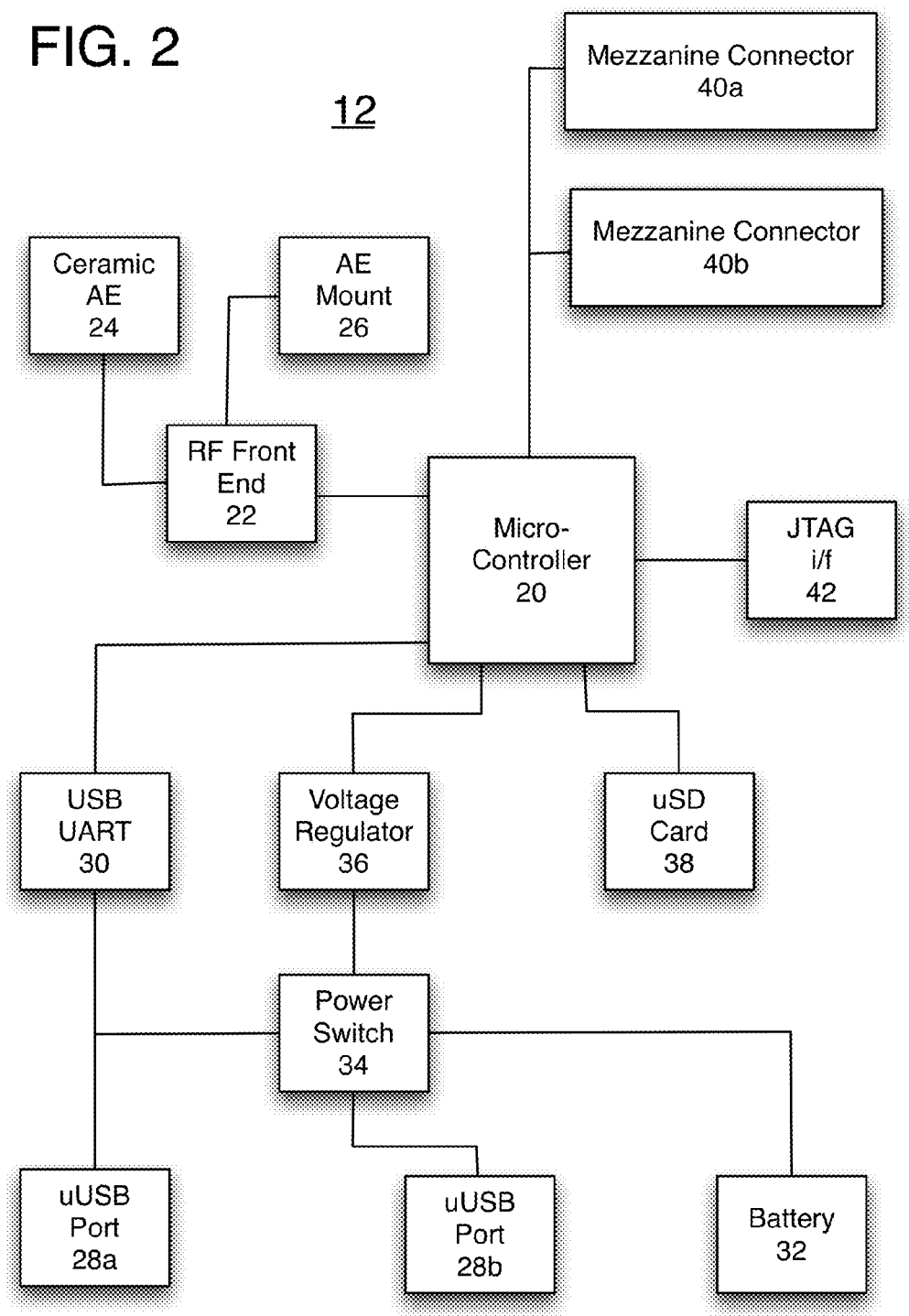
FIG. 2 is a block drawing illustrating an example of a sensor unit, consistent with an embodiment of the present invention.

FIG. 2 illustrates an example of a sensor unit 12 and controller unit 14) in greater detail. Each sensor unit includes a microcontroller 20. In some embodiments, microcontroller 20 may be a CC430-family ultra-low-power microcontroller system-on-chip with integrated RF transceiver core, available from Texas Instruments of Dallas, Tex. Of course, other microcontrollers may also be used. In general, microcontroller 20 includes a processor and, optionally, an RF receiver and RF transmitter to transmit and receive wireless signals (e.g., via an antenna). The processor controls the overall functions of the electronic device, such as running applications and controlling peripherals. Also included are short-term (e.g., non-transitory, volatile) memory to store operating instructions and to help in the execution of the operating instructions (e.g., such as the temporary storage of calculations and the like), and non-transitory, non-volatile storage to store and read instructions, files, and other data that requires long term storage. Coupled to microcontroller 20 is an RF front end 22. RF front end 22 interfaces the integrated RF transceiver of the microcontroller to a circuit board-mounted, ceramic antenna 24. An optional mount or connector 26 (e.g., a subminiature version A coaxial RF connector) for an external antenna may also be provided. In one embodiment the RF front end 22 may be a CC1101 low-power RF transceiver, available from Texas Instruments. As such, the RF front end may be physically integrated with the microcontroller 20, although it remains a separate functional unit.

In various embodiments sensor unit 12 may include one, two, or more micro-USB ports 28a, 28b. USB (or other input/output) ports provide interfaces for sensor packages and/or external computer systems/smart phones to microcontroller 20. As indicated in the illustration, one or more such ports may be interfaced to the microcontroller 20 via a USB universal asynchronous receiver transmitter (UART) 30. One example of such a UART, suitable for use in sensor unit 12, is the FT232R USB UART, available from Future Technology Devices International Ltd. of Glasgow, UK. Other USB to serial data interfaces may also be used. Of course, sensor unit 12 is not limited to the use of micro-USB ports and other such ports can be used if so desired. For example, sensor unit 12 may use one or more USB ports. Further, in some cases micro controller 20 may include one or more USB UARTs, in which case UART 30 would not be necessary.

Power for the sensor unit 12 may be provided by one or more batteries 32 which are, preferably, located on the same circuit board (e.g., in an appropriate socket) as the other components. In some instantiations, external power may be provided through a DC-to-DC converter or even AC-to-DC converter (not shown). Usually, however, if external power is provided to sensor unit 12, it is so provided via one of the micro-USB ports 28. However provided, power to microcontroller 20 is preferably routed through a switch 34 and voltage regulator 36.

Microcontroller 20 may include onboard non-volatile storage resources (e.g., flash memory) for storing sensor data. In addition, one or more Secure Digital (SD) or micro SD cards 38 may be provided. Micro SD card(s) 38 may be used for longer-term onboard storage of sensor data and/or to store an operating system and/or configuration data for the sensor unit 12. Alternatively, the sensor unit's operating system may be stored in non-volatile memory that is integral to microcontroller 20.

Optionally, one or more mezzanine connectors 40a, 40b may be provided to interface microcontroller 20 with one or more daughter cards. This provides sensor unit 12 with expansion capabilities. For example one or more cards that include such facilities as a Global Positioning System (GPS) receiver, short messaging service (SMS) or other transceiver, cellular radio, servo motor controller/actuator, or other device may be communicatively coupled to microcontroller 20 via mezzanine connectors 40a, 40b.

A JTAG or other test access port 42 for debugging and testing purposes may be provided. Alternatively, or in addition, an in-circuit programming interface (e.g., a Tag-Connect interface) (not shown) may be provided for programming microcontroller 20.

Sensor unit 12 may be configured (through use of an appropriate sensor package) for a variety of different uses. For example, sensor unit 12 may be configured with sensors that will allow the sensor unit to detect tampering with a secure package. Such sensors may include one or more accelerometers or other sensors that detect movement or one or more sensors configured to detect the breaking of a secure seal (e.g., Hall effect sensors that detect disruption of a magnetic field due to breaking of a seal). Alternatively, or in addition, the sensor unit may be configured with sensors that allow the unit to detect a change in weight of a package or other object. Upon detecting such tampering, the sensor unit may generate an alert to notify a user of the suspected tampering. The alert may be provided to a collector unit, or the collector unit may be the unit to generate the alert (e.g., based on data relayed by a sensor unit), or the alert may be provided directly from the sensor unit to an alert receiver. The alert may be in the form of an SMS or other message, an email message, an audible tone or visual indicator, or other alert.

Other security use cases include the deployment of sensor unit 12 in mobile platforms that include integral power supplies. In such instances, sensor unit 12 may be configured to monitor the power output of the integral power supply and send an alert when the power output reaches or drops below a predefined threshold. For example, sensor unit 12 may be configured to send an alert to a monitoring station when the voltage of a battery that provides power to a mobile platform or device falls below a predetermined voltage. This allows an operator to replace the battery before it fails completely.

In order to operate for extended periods without consuming significant power, microcontroller 20 is preferably configured to remain in a standby state for much of the time. Only upon detecting an event for which an alarm is required should microcontroller 20 enter a full operational mode in order to transmit an associated alert. In other embodiments where power consumption is not a limiting factor, such standby operation may not be necessary.

For those instances where the microcontroller of sensor unit 12 enters a fully operational state only when there is sensor data to transmit, the sensor unit 12 may send data in addition to the sensor data. For example, the sensor unit may also provide a date and time of the data capture and/or transmission. If the unit is equipped with location determining means (such as a GPS receiver or other location determining device), the sensor unit may also send geographic coordinates. As indicated above, the sensor data and any other data transmitted along with the sensor data may be provided to a collector unit 14. Collector unit 14 may receive and store the sensor data (and other data transmitted with the sensor data) and provide same upon request to a computer, tablet computer or smart phone 16 running an appropriate application program. The sensor data may be presented in any of a variety of formats, including chronological, data type (e.g., movement, temperature, etc.), etc. Communication between the collector unit and the computer, tablet computer or smart phone may be via wired (e.g., USB) or wireless (e.g., RF) communication means.

The computer, tablet computer or smart phone (as applicable) used to communicate with the collector unit 14 may also be used to interface with any of the sensor units 12 that make up network 10. For example, as shown in FIG. 1, where a smart phone 16 is used to communicate with collector unit 14, the smart phone may execute an application that facilitates communication with and configuration of the sensor units 12 (and collector unit 14). Such configuration may involve setting specific alert parameters (e.g., high and/or low temperatures and/or humidities, light on/off settings, etc.). Also, through the connection with the sensor units 12, smart phone 16 may monitor collected sensor data in real time. In addition, firmware updates for the sensor platforms 12 may be pushed via the smart phone 16. In such cases, an application running on the smart phone 16 may contact a remote server (e.g., using the smart phone's cellular or WiFi connection), download relevant firmware images, and then push same through the collector unit 12 connected to the individual sensor units using the sensor RF communication network.

The foregoing description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

Figure 3:
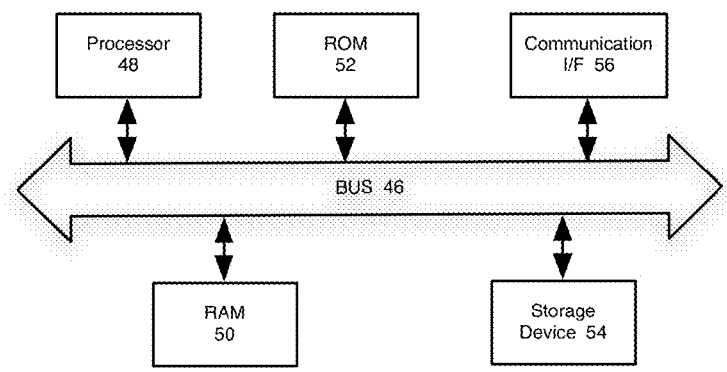
FIG. 3 is a block drawing illustrating an example of a computing environment, consistent with an embodiment of the present invention.

FIG. 3 illustrates an example of a computing environment 44, which in various instantiations may be a microcontroller of a sensor unit 12 or collector unit 14. Note, not all of the various microcontrollers may have all of the features of computing environment 44.

Computing environment 44 includes one or more busses 46 or other communication mechanisms for communicating information, and a processor 48 coupled with the bus(ses) for processing information. Computing environment 44 also includes a memory 50, such as a random access memory (RAM) or other dynamic storage medium, coupled to the bus for storing information and instructions to be executed by the processor. Memory 50 also may be used for storing temporary variables or other intermediate information during execution of instructions to be executed by processor 48.

Computing environment 44 further includes a read only memory (ROM) 52 or other static storage device (e.g., flash RAM) coupled to the bus for storing static information and instructions for the processor 48. A storage device 54, which may be a flash memory-based storage medium or other non-transitory storage medium, is provided and coupled to the bus 46 for storing information and instructions (e.g., operating systems, applications programs and the like). Computing environment 44 also includes one or more communication interfaces 56 coupled to the bus. Communication interface(s) 56 provides a two-way data communication channel with other elements of the sensor unit 12/collector unit 14, as discussed above. For example, communication interface 56 may be a serial data interface to provide a data communication connection (via a UART) to a micro USB port. The precise details of such communication paths are not critical to the present invention. What is important is that computing environment 44 can send and receive information through the communication interface and in that way communication with sensors and other computer systems and smart phones are possible.

The processes referred to herein may be implemented by processor 48 executing appropriate sequences of computer-readable instructions contained in memory 50. Such instructions may be read into memory from another computer-readable medium, such as storage device 54, and execution of the sequences of instructions contained in the memory causes the processor to perform the associated actions. In alternative embodiments, hard-wired circuitry or firmware-controlled processing units may be used in place of or in combination with processor 48 and its associated computer software instructions to implement the invention.

Figure 4:
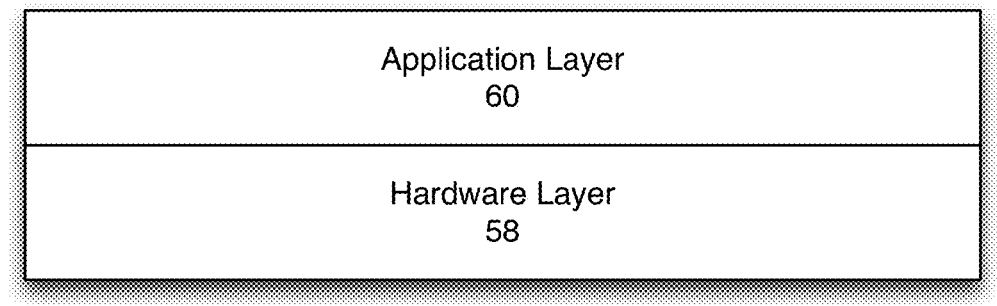
FIG. 4 is a block drawing illustrating computing environment such as a sensor unit or collector unit from the point of view of its software architecture, consistent with an embodiment of the present invention.

FIG. 4 illustrates computing environment 44 such as a sensor unit 12 or collector unit 14 from the point of view of its software architecture. The various hardware components of computing environment 44 are represented as a hardware layer 58. In this example, no separate operating system is needed to abstract the hardware layer from the application layer however, in other instantiations such an operating system layer may exist. The various applications 60 that run within computing environment 44 execute on hardware layer 58.

Figure 5:
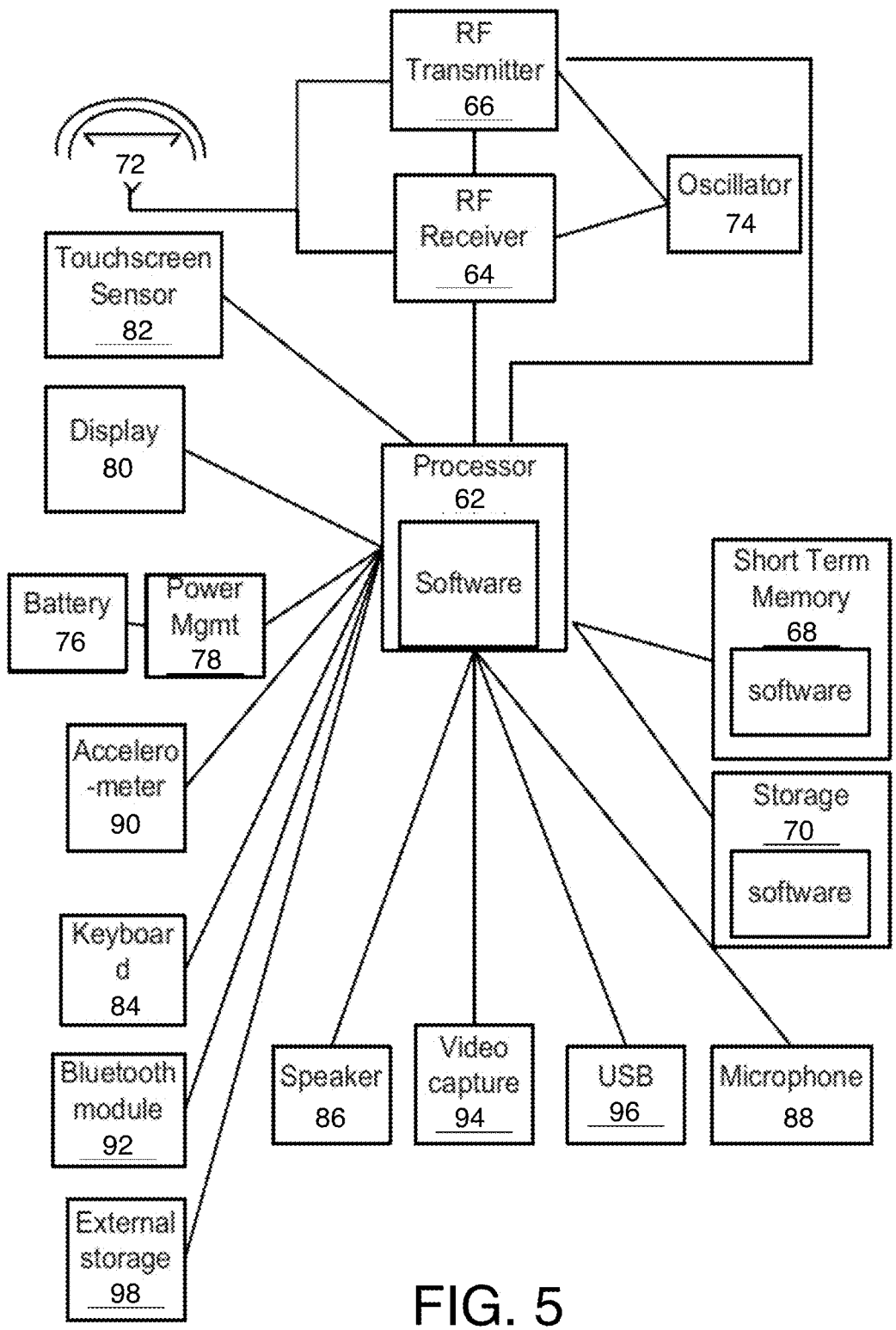
FIG. 5 illustrates an example of a computing device/platform, consistent with an embodiment of the present invention.

As noted above, the collector unit may be communicatively coupled to a personal computer system, smart phone or tablet computer 16 to download collected sensor data for analysis, long term storage, etc. FIG. 5 illustrates one example of such a platform 16 in the form of a tablet computer. Processor 62 controls the overall functions of the tablet such as running applications and controlling peripherals. Processor 62 may be any type of processor including RISC, CISC, VLIW, MISC, OISC, and the like. Processor 62 may include a Digital Signal Processor ("DSP"). Processor 62 may communicate with RF receiver 64 and RF transmitter 66 to transmit and receive wireless signals such as cellular, Bluetooth, and Wi-Fi signals. Processor 62 may use short-term memory 68 to store operating instructions and help in the execution of the operating instructions such as the temporary storage of calculations and the like. Processor 62 may also use non-transitory storage 70 to read instructions, files, and other data that requires long term, non-volatile storage.

RF receiver 64 and RF transmitter 66 may receive/send signals from/to the antenna 72 of device 16. RF transmitter 66 contains all the necessary functionality for transmitting radio frequency signals via antenna 72 given a baseband signal sent from processor 62. RF transmitter 66 may contain an amplifier to amplify signals before supplying the signal to integrated antenna 72. RF transmitter 66 and RF receiver 64 are capable of transmitting and receiving radio frequency signals of any frequency including, microwave frequency bands (0.3 to 300 GHz), which include cellular telecommunications, WLAN and WWAN frequencies. Oscillator 74 may provide a frequency pulse to both RF receiver 64 and RF transmitter 66.

Device 16 may include a battery or other power source 76 with associated power management process or module 78. Power management module 78 distributes power from the battery 76 to the other various components. Power management module 78 may also convert the power from battery 76 to match the needs of the various components. Power may also be derived from alternating or direct current supplied from a power network.

Processor 62 may communicate and control other peripherals, such as LCD display 80 with associated touch screen sensor 82. Processor 62 causes images to be displayed on LCD display 80 and receives input from the touch screen sensor 82 when a user presses on the touch-screen display. In some examples touch screen sensor 82 may be a multi-touch sensor capable of distinguishing, and processing gestures.

Processor 62 may receive input from a physical keyboard 84. Processor 62 may produce audio output, and other alerts which are played on the speaker 86. Speaker 86 may also be used to play voices (in the case of a voice phone call) that have been received from RF receiver 64 and been decoded by processor 62. Microphone 88 is used to transmit a voice for a voice call conversation to processor 62 for subsequent encoding and transmission using RF transmitter 66. Microphone 88 may also be used as an input device for commands using voice-processing software. Accelerometer 90 provides input on the motion of the device 16 to processor 62. Accelerometer 90 may be used in motion sensitive applications. Bluetooth module 92 may be used to communicate with Bluetooth enabled external devices. Video capture device 94 may be a still or moving picture image capture device or both. Video capture device 94 is controlled by processor 62 and may take and store photos, videos, and may be used in conjunction with microphone 88 to capture audio along with video. USB port 96 enables external connections to other devices supporting the USB standard and charging capabilities. USB port 96 may include all the functionality to connect to, and establish a connection with an external device over USB. External storage module 98 may include any form of removable physical storage media such as a flash drive, micro SD card, SD card, Memory Stick and the like. External storage module 98 may include all the functionality needed to interface with these media.

Thus, a low power, wireless RF communications platform configurable as a sensor unit and operable to collect and relay data concerning monitored parameters to a designated collector unit has been described.

What is claimed is:

1. A wireless radio frequency communications platform, comprising:
   a plurality of sensor devices configured to collect data concerning monitored parameters and relay the collected data to a data collector device via a wireless radio frequency communication, wherein for each of the sensor devices, (i) said each of the sensor devices includes a memory configured to store the collected data only when communication with the collector device is disrupted, and (ii) said each of the sensor devices is configured to include an indication of a power level of said each of the sensor devices when relaying the collected data to the collector device; and the collector device communicatively coupled over a wireless radio frequency communications network to the plurality of sensor devices and configured to: receive and store the collected data received from the plurality of sensor devices, transmit the collected data to a smart phone upon receiving an indication that the collector device is communicatively coupled to the smart phone, and send an alert to the smart phone upon receiving an indication that an observable event relating to one or more of the monitored parameters has occurred or is occurring from one of the plurality of sensor devices, wherein the smart phone is configured by a computer software application to download firmware updates from a server, and then transmit the firmware updates to the plurality of sensor devices via the collector device communicatively coupled to the plurality of sensor devices.

2. The wireless radio frequency communications platform of claim 1, wherein said each of the plurality of sensor devices is configured to operate in a low-power standby mode until the observable event occurs.

3. The wireless radio frequency communications platform of claim 1, wherein said each of the sensor devices is self-contained and portable.

4. The wireless radio frequency communications platform of claim 1, wherein communication between the plurality of sensor devices and the collector device is encrypted.

5. The wireless radio frequency communications platform of claim 1, wherein the monitored parameters include at least one of temperature, humidity, light, motion, movement, magnetic fields, and electric fields.

6. The wireless radio frequency communications platform of claim 1, wherein the wireless radio frequency communications network is compliant with Institute of Electrical and Electronics Engineers (IEEE) standard 802.15.

7. The wireless radio frequency communications platform of claim 1, further comprising:
a router communicatively coupled to the collector device and the plurality of sensor devices, the router configured to receive the collected data from the plurality of sensor devices prior to receipt by the collector device and transmit the collected data to the collector device.

8. The wireless radio frequency communications platform of claim 1, wherein the collector device is self-contained and portable.

9. A system, comprising:
a plurality of sensor units, each sensor unit of the plurality of sensor units comprising:
a sensing device configured to collect data concerning a monitored parameter;
a wireless radio frequency transmitter configured to transmit the collected data to a data collector device;
a first memory configured to store the data collected by the sensing device only when communication with the collector device is disrupted;
a first processor for controlling an operation of said each sensor unit; and
a first power source configured to provide power to the sensing device, the first memory, the first processor, and the wireless radio frequency transmitter;
the collector device comprising:
a wireless radio frequency transceiver configured to receive the collected data from the wireless radio frequency transmitter of said each of the plurality of sensor units, and transmit the received collected data to a smart phone;
a second memory configured to store the received collected data and provide the received collected data to the wireless radio frequency transceiver for transmission to the smart phone upon receiving an indication that the collector device is communicatively coupled to the smart phone;
a second processor for controlling an operation of the collector device; and
a second power source configured to provide power to the wireless radio frequency transceiver, the second memory, and the second processor; and the smart phone, wherein the smart phone is configured by a computer software application to download firmware updates from a server, and then transmit the firmware updates to the plurality of sensor units via the collector device communicatively coupled to the plurality of sensor units.

10. The system of claim 9, further comprising:
a router communicatively coupled to the collector device and the plurality of sensor units and being positioned between the collector device and the plurality of sensor units, the router being configured to receive the collected data from the plurality of sensor units, and transmit the collected data to the collector device.

11. The system of claim 9, wherein at least one of the sensor units further comprises:
a mezzanine connector coupled to the first processor and configured to facilitate connection of the at least one sensor unit to a device external to the at least one sensor unit.

* * * * *